(12) United States Patent
Vande Velde et al.

(10) Patent No.: US 10,097,727 B2
(45) Date of Patent: Oct. 9, 2018

(54) COLORANT SPLITTING METHOD

(71) Applicant: AGFA NV, Mortsel (BE)

(72) Inventors: Koen Vande Velde, Mortsel (BE); Marc Mahy, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/037,749

(22) PCT Filed: Nov. 25, 2014

(86) PCT No.: PCT/EP2014/075449
§ 371 (c)(1),
(2) Date: May 19, 2016

(87) PCT Pub. No.: WO2015/078827
PCT Pub. Date: Jun. 4, 2015

(65) Prior Publication Data
US 2016/0301829 A1    Oct. 13, 2016

(30) Foreign Application Priority Data

Nov. 29, 2013 (EP) .................................... 13195023

(51) Int. Cl.
| | | |
|---|---|---|
| *G06K 15/00* | (2006.01) |
| *H04N 1/405* | (2006.01) |
| *H04N 1/40* | (2006.01) |
| *H04N 1/52* | (2006.01) |
| *G06K 15/10* | (2006.01) |
| *H04N 1/60* | (2006.01) |

(52) U.S. Cl.
CPC ....... *H04N 1/40018* (2013.01); *G06K 15/102* (2013.01); *H04N 1/405* (2013.01); *H04N 1/40087* (2013.01); *H04N 1/52* (2013.01); *H04N 1/6008* (2013.01); *H04N 2201/0082* (2013.01)

(58) Field of Classification Search
CPC .......... H04N 1/40018; H04N 1/40087; H04N 1/405; H04N 1/52; H04N 1/6008; H04N 2201/0082; G06K 15/102
USPC ................................ 358/3.06, 515, 1.15, 1.9
See application file for complete search history.

(56) References Cited

U.S. PATENT DOCUMENTS 6,027,196 A    2/2000  Gotoh et al.
6,172,692 B1   1/2001  Huang et al.
(Continued)

FOREIGN PATENT DOCUMENTS

EP    1 107 575 A2    6/2001
EP    1 215 885 A2    6/2002
(Continued)

OTHER PUBLICATIONS

Official Communication issued in International Patent Application No. PCT/EP2014/075449, dated Feb. 11, 2015.

*Primary Examiner* — Quang N Vo
(74) *Attorney, Agent, or Firm* — Keating and Bennett, LLP

(57) ABSTRACT

A colorant splitting method performed by a colorant splitter wherein an n-dimensional color in an n-dimensional colorant space is converted to an m-dimensional colorant space by a colorant splitting curve set and wherein the colorant splitting curve set is the result of interpolation of a set of colorant splitting curve sets to improve the image quality of reproduced content and to improve the usage of total coverage of the colorants.

5 Claims, 8 Drawing Sheets

(56) References Cited

U.S. PATENT DOCUMENTS

| | | | |
|---|---|---|---|
| 6,435,657 | B1 | 8/2002 | Couwenhoven et al. |
| 7,193,747 | B2 * | 3/2007 | Saito .................... H04N 1/6025 358/1.9 |
| 2003/0107763 | A1 * | 6/2003 | Hagai ................ H04N 1/40087 358/1.15 |
| 2005/0073724 | A1 | 4/2005 | Maltz |
| 2005/0140711 | A1 * | 6/2005 | Oshima ................. G06F 3/1207 347/14 |
| 2009/0303556 | A1 * | 12/2009 | Lieberman ............... H04N 1/52 358/515 |
| 2010/0141970 | A1 | 6/2010 | Couwenhoven et al. |

FOREIGN PATENT DOCUMENTS

| | | |
|---|---|---|
| EP | 1 353 497 A2 | 10/2003 |
| EP | 1 998 551 A1 | 12/2008 |

\* cited by examiner

COLORANT SPLITTING METHOD

CROSS-REFERENCE TO RELATED APPLICATIONS

This application is a 371 National Stage Application of PCT/EP2014/075449, filed Nov. 25, 2014. This application claims the benefit of European Application No. 13195023.0, filed Nov. 29, 2013, which is incorporated by reference herein in its entirety.

BACKGROUND OF THE INVENTION

1. Field of the Invention

The present invention relates to a colorant splitting method to convert base colorants, such as cyan, to their constituent colorants such as light cyan and heavy cyan. This method is mainly used in content constituent output devices such as an inkjet printer printing in a CMYKcm colorant space.

2. Description of the Related Art

To convert colours from a base colorant space, such as CMYK, to a constituent colorant space, such as CMYKcm, a colorant splitting method is known in the state-of-the-art.

U.S. Pat. No. 6,027,196 (CANON) discloses a recording method for gradation recording with constituent colorants (light and dark coloured inks) and apparatus therefore by using a colorant splitting method.

EP 1353497 A (AGFA GRAPHICS) discloses a method and a system are described for characterizing a printing device, wherein the system includes a forward look up table for obtaining colour values as a function of given colorant values for the printing device. The forward look up table includes a plurality of sampling points wherein at least one of the sampling points is a colorant changing point (an ink changing point) of a constituent colorant.

U.S. Pat. No. 6,172,692 B (LEXMARK INTERNATIONAL INC) discloses a method to create a look-up-table for the use in a colorant splitting method wherein base colorants (saturated ink) and constituent colorants (diluted inks) are used; and to smooth the colorant splitting curve set CSC from the look-up-table by a smoothing method; and to optimize the colorant splitting curve set CSC to improve image quality of the reproduced content such as graininess (granularity), gloss or substrate ink tolerances.

In the state-of-the-art a colorant splitting method is used to convert an n-dimensional colour in an n-dimensional colorant space to an m-dimensional colour in an m-dimensional colorant space wherein the colorants of the n-dimensional colorant space are n base colorants $\{C_1, \ldots, C_n\}$; and wherein a set of the colorants of the m-dimensional colorant space are constituent colorants $\{c_{i,1}, \ldots, c_{i,k}\}$ of a base colorant $C_i$; and wherein the tone value of the base colorant $C_i$ in the n-dimensional colour are converted with only one colorant splitting curve set $CSC_i$ of the base colorant $C_i$ to tone values for the constituent colorants $\{c_{i,1}, \ldots, C_{i,k}\}$.

There is need to have a colorant splitting method to improve image quality of reproduced content, such as graininess, and to improve the usage of total coverage of the colorants, such as less ink consumption in printing devices.

SUMMARY OF THE INVENTION

A preferred embodiment of the invention is a colorant splitting method of an n-dimensional colour to an m-dimensional colour in an m-dimensional colorant space wherein a set of the colorants are constituent colorants $\{c_{i,1}, \ldots, C_{i,k}\}$ of a base colorant $C_i$; and wherein a new colorant splitting curve set $CSC_{i,new}$ is used after the interpolation of a set of colorant splitting curve sets $\{CSC_{i,1}, \ldots, CSC_{i,p}\}$ to the new colorant splitting curve set $CSC_{i,new}$.

A preferred embodiment of the present invention discloses a method wherein a content constituent output device gets control to specify the graininess in a rendered image depending on the coverage of the base colorants $\{C_1, \ldots, C_n\}$. For example the graininess in multi-colour highlights of the rendered image should be low because grainy highlights are not pleasing for the eye, at the other side graininess in the multi-colour shadows and dark multi-colours may be high because it does not influence print quality evaluation due to the darkness in such rendered areas.

An additional advantage of the present invention is that by controlling the graininess by altering the graininess in the multi-colour shadows and dark multi-colours after the interpolation step depending on the equivalent coverage, the amount of total ink in these areas is saved. The number of constituent colorants are in these area minimized, by a higher graininess, which results in ink saving. The saving of ink is a very great economic advantage which is one of the big advantages of the present invention.

Another advantage is that invention may guarantee a minimum colour difference between rendered images with one of the colorant splitting curve set of the set of colorant splitting curve sets and a rendered image with the new colorant splitting curve set. To guarantee this preferred embodiment of the present invention all colorant splitting curve sets of the set of colorant splitting curve sets $\{CSC_{i,1}, \ldots CSC_{i,p}\}$ for base colorant $C_i$ gives the same colour when converting and rendering a tone value of the base colorant $C_i$ in the n-dimensional colour with each of the colorant splitting curve sets to tone value for the constituent colorants $\{c_{i,1}, \ldots, c_{i,k}\}$. The interpolated new colorant splitting curve set shall also have the same colour when converting and rendering the tone value of the base colorant $C_i$ in the n-dimensional colour with the new colorant splitting curve set to a tone value for the constituent colorants $\{c_{i,1}, \ldots, c_{i,k}\}$. This present preferred embodiment guarantees thus the same colors with the new colorant splitting curve set after rendering. Together with ink savings advantage is this very great economic advantage especially in the home desktop printers where the cost of ink cartridges is very high.

The invention interpolates between the colorant splitting curve sets of a set of colorant splitting curve sets, after they are determined.

BRIEF DESCRIPTION OF THE DRAWINGS

In FIG. 1 the splitting curve set $CSC_i$ (200) returns for a tone value of the base colorant $C_i$ of 50%, a tone value 60% for the constituent colorant $c_{i,1}$ and 0% for the constituent colorant $c_{i,2}$. It also returns for a tone value of the base colorant $C_i$ of 100%, a tone value 0% for the constituent colorant and 100% for the constituent colorant $c_{i,2}$. The first curve (401) could be represented as a piecewise-defined function e.g.

$$\begin{cases} v_{c_{i,1}} = \frac{60}{50} \times V_{C_i} \leftarrow 0\% \leq V_{C_i} \leq 50\% \\ v_{c_{i,1}} = -\frac{60}{50} \times V_{C_i} + \frac{60 \times 100}{50} \leftarrow 100\% \geq V_{C_i} > 50\% \end{cases}$$

This piecewise-defined function is also a piecewise linear function which may also be represented as a look-up-table (LUT) e.g.

TABLE 1

| | |
|---|---|
| 0% | 0% |
| 50% | 60% |
| 100% | 0% |

Figure 1:
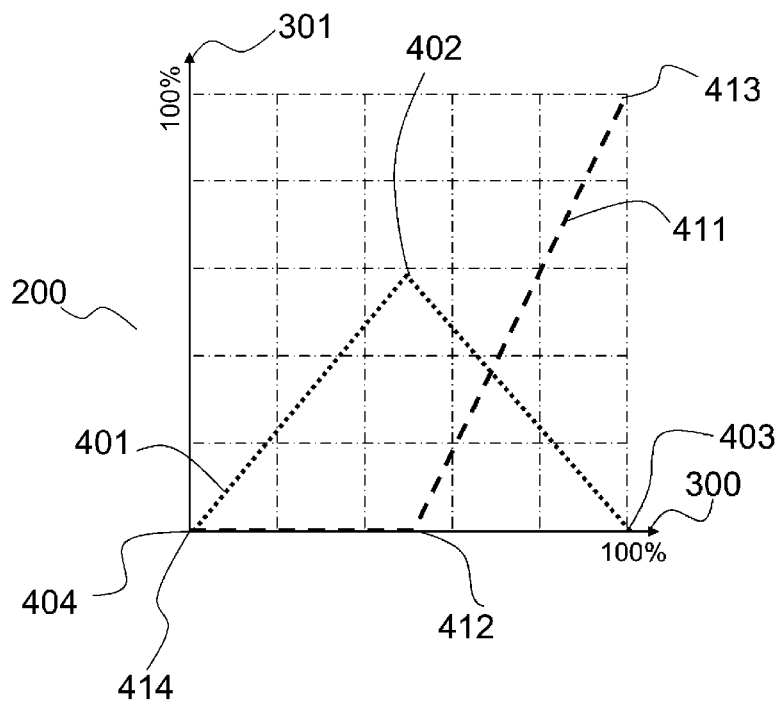
FIG. 1, FIG. 2, FIG. 3, FIG. 4, FIG. 7, FIG. 8 and FIG. 9 illustrate colorant splitting curve sets $CSC_i$ (200) of a base colorant $C_i$ with two curves (401, 411) for the constituent colorants $\{c_{i,1}, c_{i,2}\}$. The X-axis (300) represents the tone values of the base colorant $C_i$ and on the Y-axis (301) the tone values of the constituent colorants $\{c_{i,1}, c_{i,2}\}$ can be read. The first curve (401) represents the curve for the constituent colorant $c_{i,1}$ and the other curve (411) represent the curve for the constituent colorant $c_{i,2}$. A tone value of the base colorant $C_i$ and the constituent colorants $\{c_{i,1}, c_{i,2}\}$ ranges in these figures from 0% to 100% percent.

The points (404, 402, 403) in the first curve (401) and the points (414, 412, 413) in the other curve (411) of the colorant split curve set $CSC_i$ of the base colorant $C_i$ in FIG. 1 are colorant changing points (CCP's).

Figure 2:
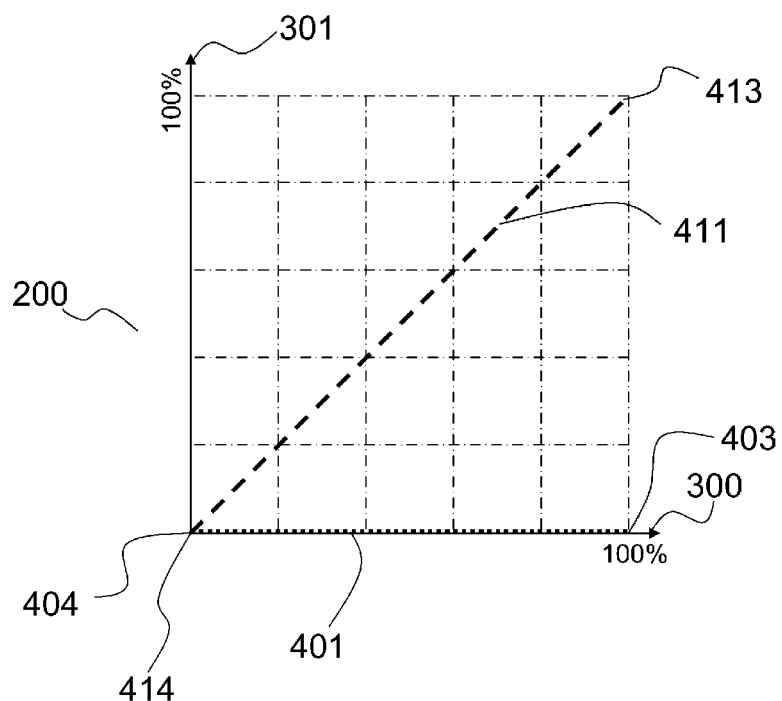

In FIG. 2 the splitting curve set $CSC_i$ returns for each tone value of the base colorant $C_i$ a tone value 0% for the constituent colorant $c_{i,1}$. The graininess of the reproduction of a content with the use of such a $CSC_i$ shall be higher than the use of a $CSC_i$ represented in FIG. 1 if the luminance of the CIELab value of the constituent colorant $c_{i,1}$ is higher than the luminance of the CIELab value of the constituent colorant $c_{i,2}$ because the constituent colorant $c_{i,1}$ is not used in the reproduction of the content. The points (404, 403) in the first curve (401) and the points (414, 413) in the other curve (411) of the colorant split curve set $CSC_i$ of the base colorant $C_i$ are colorant changing points (CCP's).

Figure 3:
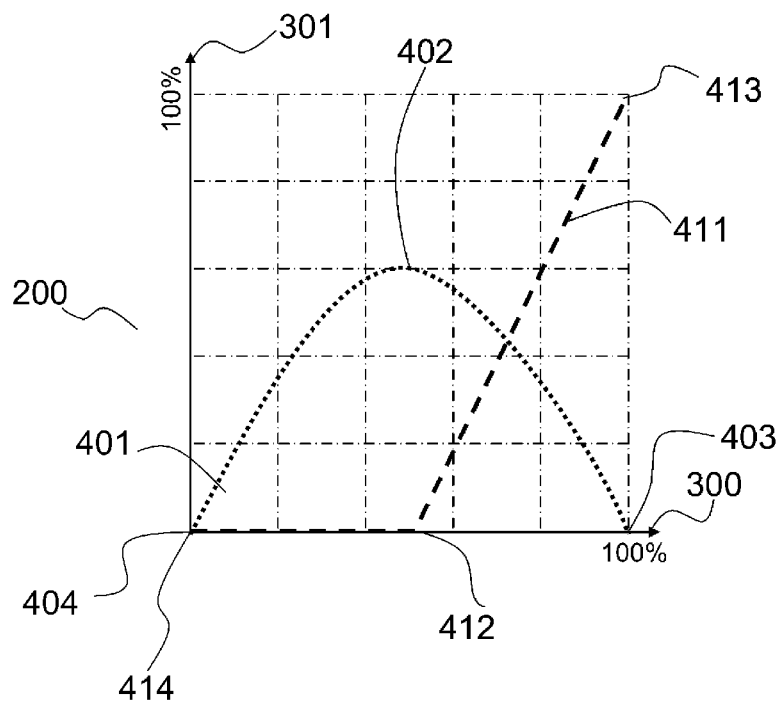

In FIG. 3 the splitting curve set $CSC_i$ returns for a tone value of the base colorant $C_i$ of 50%, a tone value 60% for the constituent colorant $c_{i,1}$ and 0% for the constituent colorant $c_{i,2}$. The first curve (401) could be represented as a piecewise-defined function e.g.

$$\left\{ v_{c_{i,1}} = \frac{-6}{250} \times (v_{C_i})^2 + \frac{60}{25} \times (v_{C_i}) \leftarrow 0\% \leq v_{C_i} = 100\% \right\}$$

The points (404, 402, 403) in the first curve (401) and the points (414, 412, 413) in the other curve (411) of the colorant split curve set CSCi of the base colorant Ci are colorant changing points (CCP's).

Figure 4:
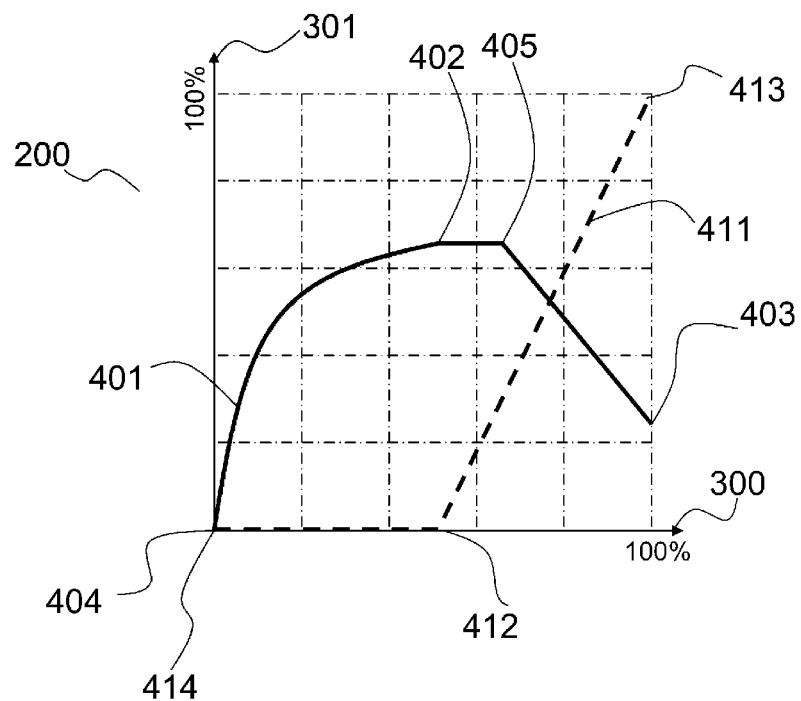

In FIG. 4 the splitting curve set $CSC_i$ comprises the points (404, 402, 403, 405) in the first curve (401) and the points (414, 412, 413) in the other curve (411) of the colorant split curve set $CSC_i$ of the base colorant $C_i$ as colorant changing points (CCP's).

Figure 5:
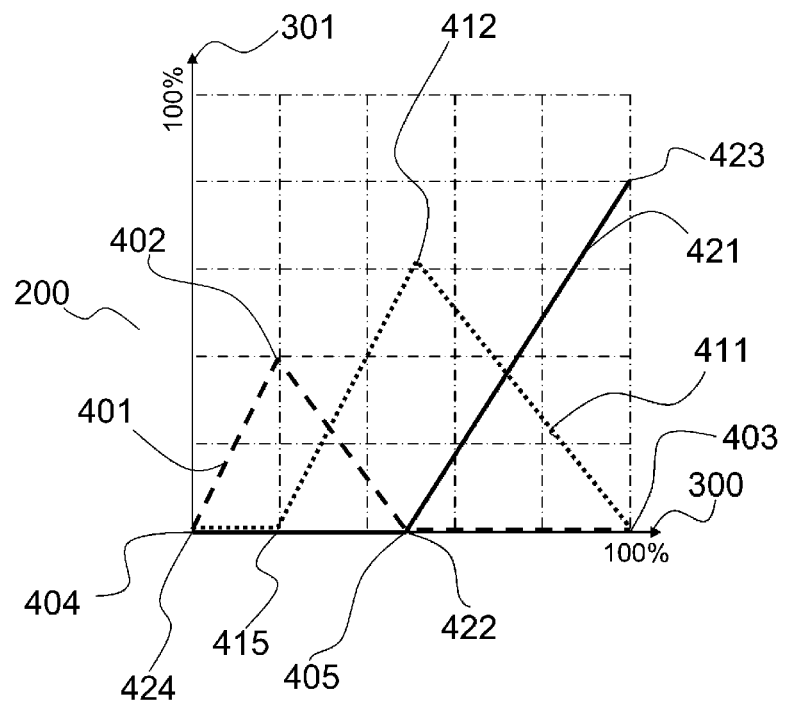

FIG. 5 illustrates a colorant splitting curve set $CSC_i$ (200) of a base colorant $C_i$ with three 3 curves (401, 411, 421) for the constituent colorants $\{c_{i,1}, c_{i,2}, c_{i,3}\}$. The X-axis (300) represents the tone values of the base colorant $C_i$ and on the Y-axis (301) the tone values of the constituent colorants $\{c_{i,1}, c_{i,2}, c_{i,3}\}$ can be read. The first curve (401) represents the curve for the constituent colorant $c_{i,1}$ and the curve (411) represent the curve for the constituent colorant $c_{i,2}$ and the curve (421) represent the curve for the constituent colorant $c_{i,3}$. A tone value of the base colorant $C_i$ and the constituent colorants $\{c_{i,1}, c_{i,2}, c_{i,3}\}$ ranges in this figure from 0% to 100% percent.

Figure 6:
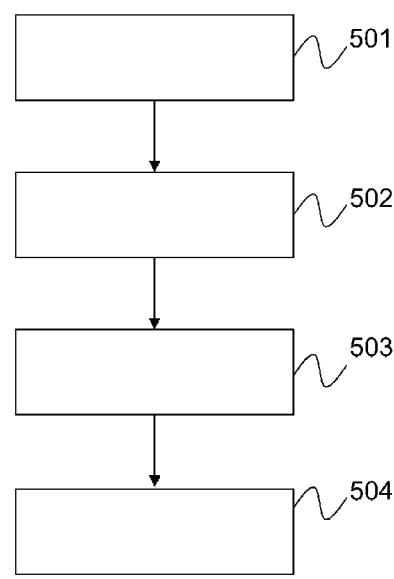

FIG. 6 illustrates steps of converting the presentation of content, such as a document, to a reproduction of the content on a content constituent output device. The first step (501, INTER) manipulates the presentation of the content to a two-dimensional discrete image M(x, y) in an n-dimensional colorant space with n base colorants $\{C_1, C_2, \ldots, C_n\}$ in a image manipulation device such as a raster image processor (RIP). The second step (502, SPLIT) converts the M(x, y) to a two-dimensional discrete image N(x, y) in an m-dimensional colorant space which comprises constituent colorants $\{c_{i,1}, c_{i,2}, \ldots, c_{i,k}\}$ of one of the base colorants $C_i$. The third step (503, SCREEN) converts the N(x, y) to a halftone O(x, y) and the fourth step (504, TRANSF) transfers the halftone O(x, y) to a content constituent output device to reproduce the presentation of the content.

Figure 7:
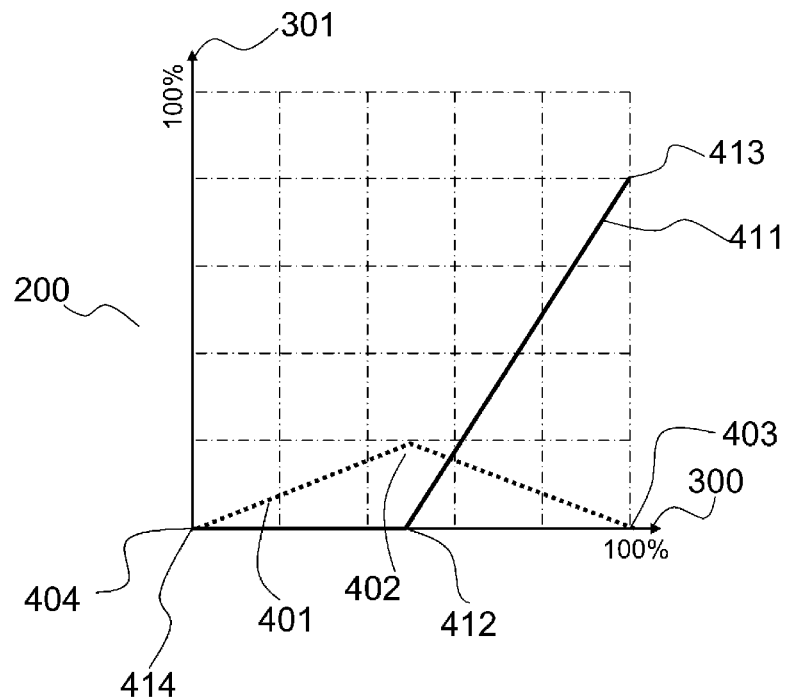
Figure 8:
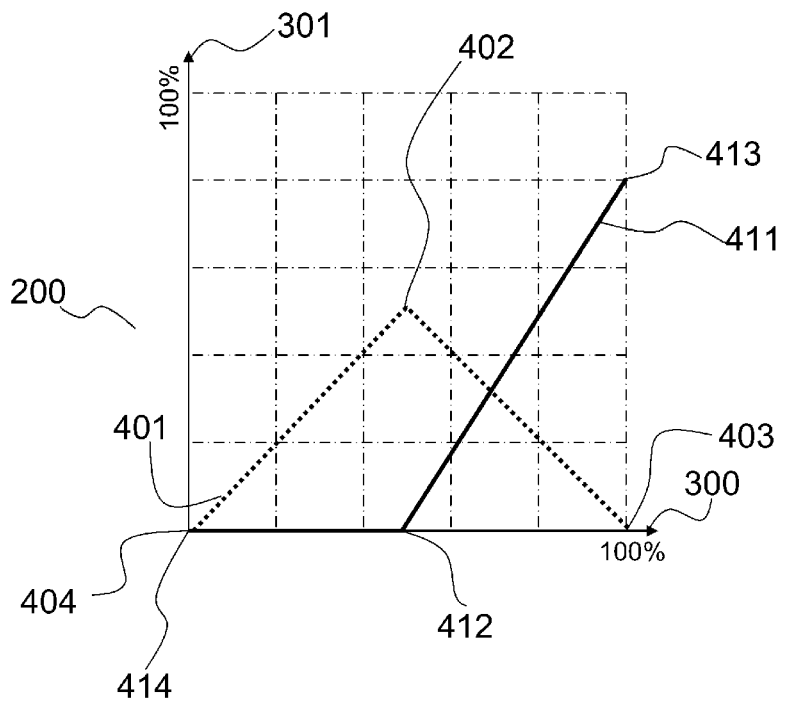
Figure 9:
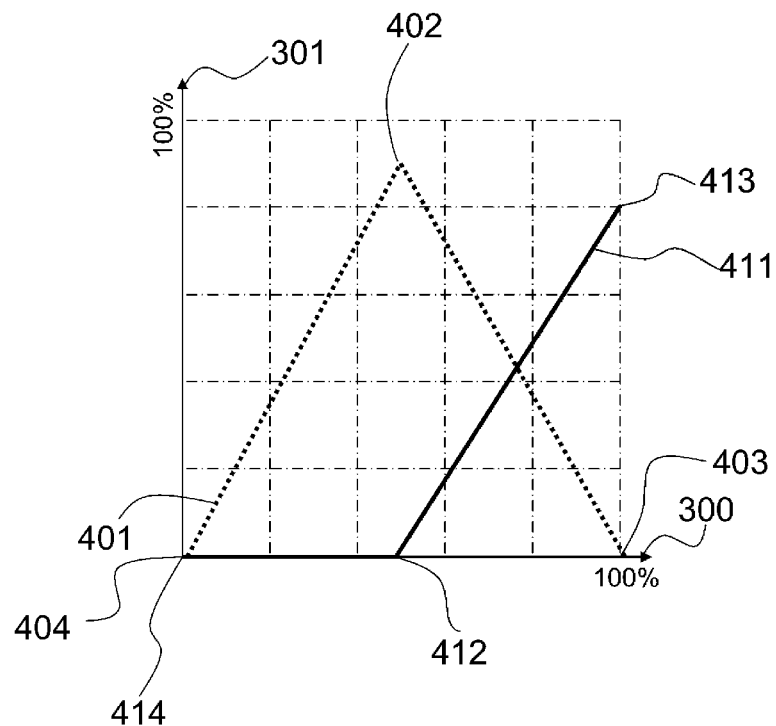

FIG. 7, FIG. 8, FIG. 9 illustrate colorant splitting curve sets $CSC_i$ (200) of a base colorant $C_i$ with two curves (401, 411) for the constituent colorants $\{c_{i,1}, c_{i,2}\}$. The first curve (401) results in a tone value for the constituent colorant $c_{i,1}$ for a tone value of the base colorant $C_i$ and the other curve (411) results in a tone value for the constituent colorant $c_{i,2}$ for a tone value of the base colorant $C_i$. The luminance of the CIELab value of the constituent colorant $c_{i,1}$ is higher than the luminance of the CIELab value of the constituent colorant $c_{i,2}$ in FIG. 7, FIG. 8 and FIG. 9. The graininess of the CSCi (200) of FIG. 9 is lower than the graininess of the CSCi (200) of FIG. 8 due to less usage of the constituent colorant $c_{i,1}$ for each tone value of the base colorant $C_i$. The graininess of the CSCi (200) of FIG. 8 is lower than the graininess of the CSCi (200) of FIG. 7 due to less usage of the constituent colorant $c_{i,1}$ for each tone value of the base colorant $C_i$. In FIG. 7, FIG. 8 and FIG. 9 the splitting curve set $CSC_i$ comprises the points (404, 402, 403) in the first curve (401) and the points (414, 412, 413) in the other curve (411) of the colorant split curve set $CSC_i$ of the base colorant $C_i$ as colorant changing points (CCP's).

Figure 10:
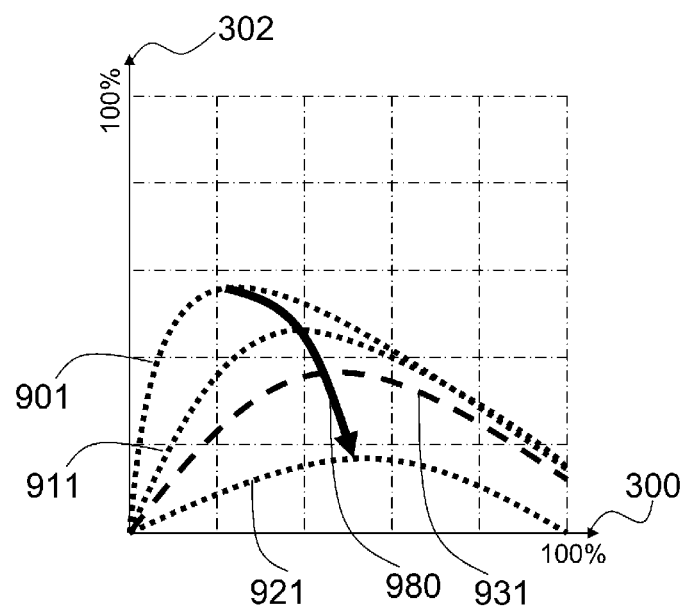

FIG. 10 illustrates curves (901, 911, 921, 931) of colorant splitting curves of a base colorant $C_i$ for a constituent colorant $c_{i,j}$ of the base colorant $C_i$. The X-axis (300) represents the tone values of the base colorant $C_i$ and on the Y-axis (302) the tone values of the constituent colorant $c_{i,j}$ can be read. A tone value of the base colorant $C_i$ and the constituent colorant $c_{i,j}$ ranges in this figure from 0% to 100% percent. The curve (931) is the result of the interpolation (480) of the other curves (901, 911, 921).

Figure 11:
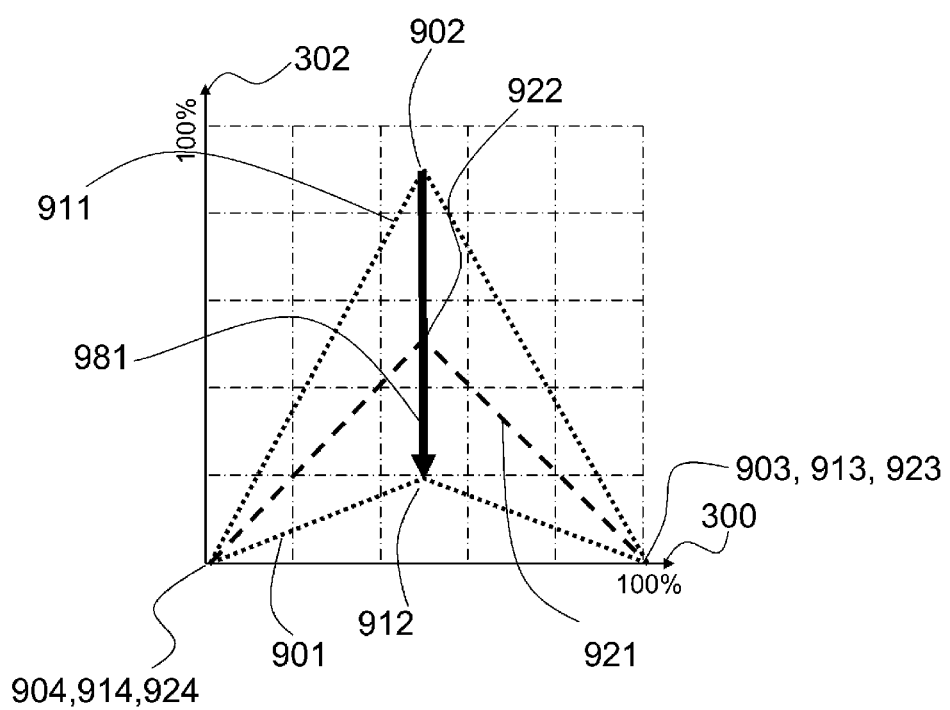

FIG. 11 illustrates curves (901, 911, 921) of colorant splitting curves of a base colorant Ci for a constituent colorant $c_{i,j}$ of the base colorant $C_i$. The X-axis (300) represents the tone values of the base colorant $C_i$ and on the Y-axis (302) the tone values of the constituent colorant $c_{i,j}$ can be read. A tone value of the base colorant $C_i$ and the constituent colorants $c_{i,j}$ ranges in this figure from 0% to 100% percent. The points (902, 912, 922, 903, 913, 923, 904, 914, 924) on these curves are colorant changing points (CCP's). The curve (921) is the result of the interpolation of the other curves (901, 911) by an interpolation of the colorant changing points (902, 912) with as result a colorant changing point (922) on the curve (921). The path (981) is an interpolation path.

Figure 12:
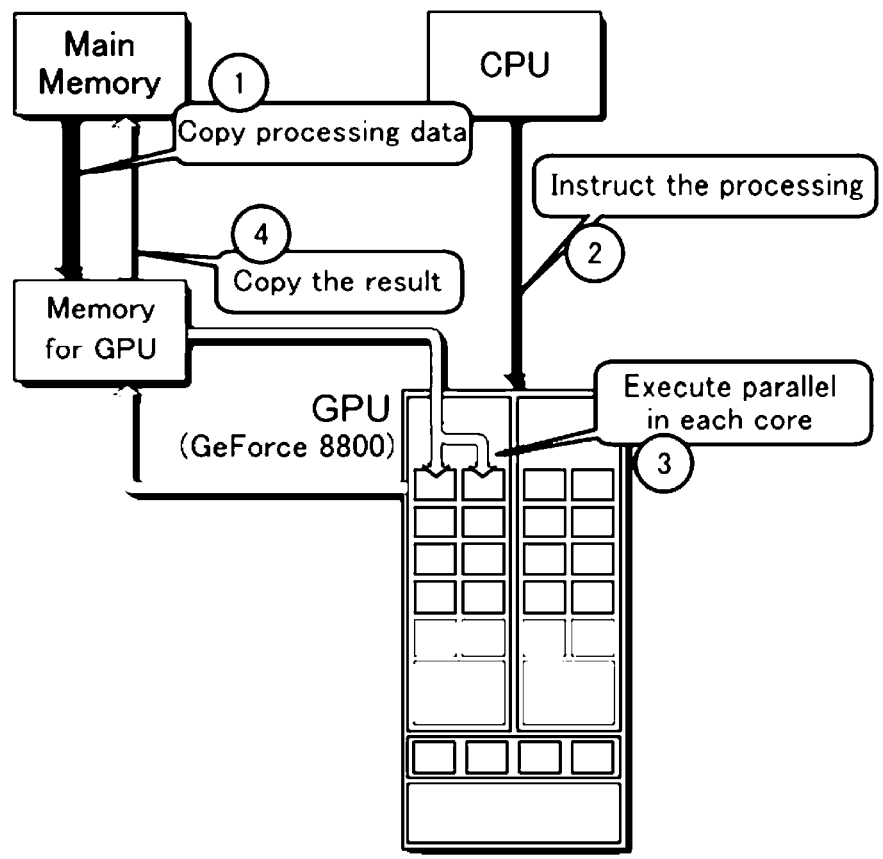

FIG. 12 illustrates a CUDA processing workflow.

Figure 13:
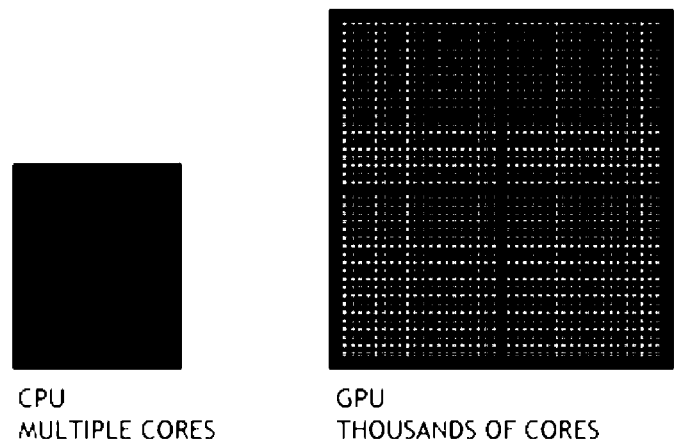

FIG. 13 is an illustration of a CPU with multiple cores and GPU with thousands of cores.

Figure 14:
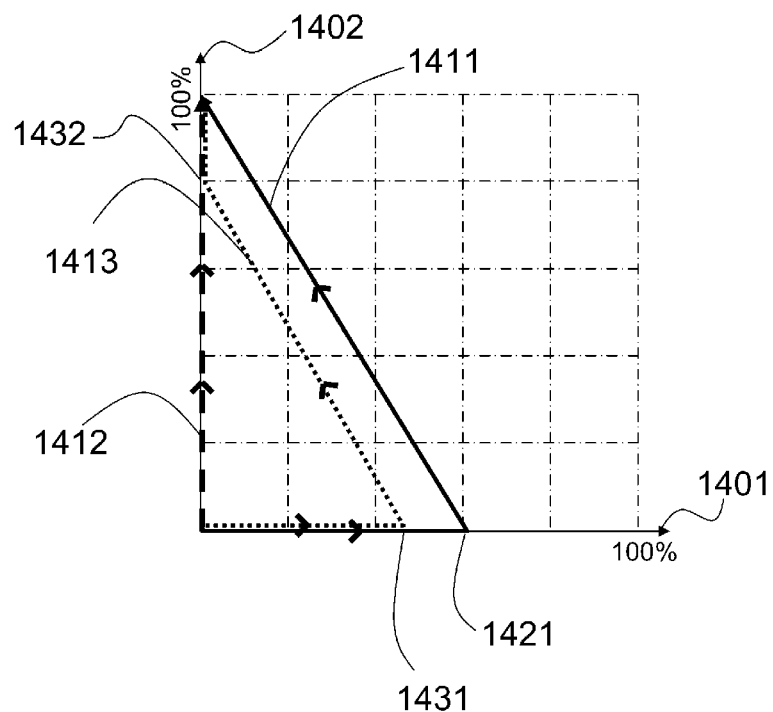

FIG. 14 illustrates a colorant triangle of two colorant splitting curve sets.

Figure 15:
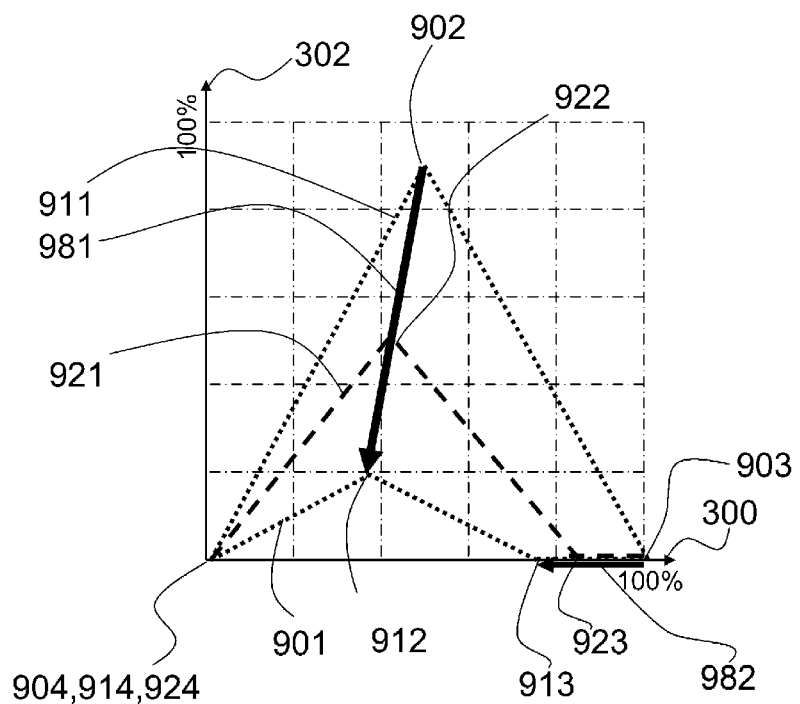

FIG. 15 illustrates curves (901, 911, 921) of colorant splitting curves of a base colorant Ci for a constituent colorant $c_{i,j}$ of the base colorant $C_i$. The X-axis (300) represents the tone values of the base colorant $C_i$ and on the Y-axis (302) the tone values of the constituent colorant $c_{i,j}$ can be read. A tone value of the base colorant $C_i$ and the constituent colorants $c_{i,j}$ ranges in this figure from 0% to 100% percent. The points (902, 912, 922, 903, 913, 923, 904, 914, 924) on these curves are colorant changing points (CCP's). The curve (921) is the result of the interpolation of the other curves (901, 911) by an interpolation of the colorant changing points (902, 912) with as result a colorant changing point (922) on the curve (921) and interpolation of the colorant changing points (903, 913) with as result a colorant changing point (923) on the curve (921). The path's (981, 982) are interpolation paths.

DETAILED DESCRIPTION OF THE PREFERRED EMBODIMENTS

The invention is a colorant splitting method of an n-dimensional colour in an n-dimensional colorant space to an m-dimensional colour in an m-dimensional colorant space wherein the colorants of the n-dimensional colorant space are n base colorants $\{C_1, \ldots, C_n\}$; and wherein a set of the colorants of the m-dimensional colorant space are constituent colorants $\{c_{i,1}, \ldots, c_{i,k}\}$ of a base colorant $C_i$; and wherein the colorant splitting method is characterized by interpolating a set of colorant splitting curve sets $\{CSC_{i,1}, \ldots, CSC_{i,p}\}$ to a new colorant splitting curve set $CSC_{i,new}$; and converting the tone value of the base colorant $C_i$ in the n-dimensional colour with the new colorant splitting curve set $CSC_{i,new}$ to tone values for the constituent colorants $\{c_{i,1}, \ldots, c_{i,k}\}$. A preferred embodiment of the colorant splitting method is preferably encompassed in a content reproduction method, such as a printing method, on a content constituent output device, such as printer device.

In a preferred embodiment the amount of colorant splitting curve sets in the set of colorant splitting curve sets is two.

By interpolating the colorant splitting curve sets $\{CSC_{i,1}, \ldots, CSC_{i,p}\}$ of the base colorant set as in a preferred embodiment of the colorant splitting method the graininess of the new splitting curve set may be controlled.

A preferred embodiment of the colorant splitting method comprises an extra step by calculating an equivalent coverage $EC_i$ of the base colorant $C_i$ as parameter of the interpolation of set of colorant splitting curve sets $\{CSC_{i,1}, \ldots, CSC_{i,p}\}$. To make the interpolation of the set of colorant splitting curve sets $\{CSC_{i,1}, \ldots, CSC_{i,p}\}$ depending from the equivalent coverage $EC_i$ of the base colorant $C_i$ the total coverage of the colorants in the reproduction of a content on a content constituent output device may be influenced such as less ink consumption in printing devices. Or the graininess in the reproduction of the content on the content constituent output device may be influenced.

The calculating of the equivalent coverage $EC_i$ of the base colorant $C_i$ may comprise a step of selecting weights to a set of base colorants part of the n base colorants. The weights may be determined by measuring the contrast of the set of base colorants part of the n base colorants.

In a preferred embodiment of the colorant splitting method an extra step is comprised by checking the equivalent coverage $EC_i$ of the base colorant $C_i$ is part of a transition interval $[T_1, T_2]$ to indicate the region of using the new colorant splitting curve set $CSC_{i,new}$. The graininess of the new colorant splitting curve set $CSC_{i,new}$ may then be controlled in this transition interval $[T_1, T_2]$.

A preferred embodiment of the colorant splitting method may have a step of determining by a determination device the set of colorant splitting curve sets $\{CSC_{i,1}, \ldots, CSC_{i,p}\}$ of the base colorant $C_i$. For determining a set of colorant splitting curve sets $\{CSC_{i,1}, \ldots, CSC_{i,p}\}$ of a base colorant $C_i$ a characterization, such as graininess, of a colorant splitting curve set may be measured in a preferred embodiment of the colorant splitting method and preferably the determination is based on measured graininess as characterization of the colorant splitting curve sets $\{CSC_{i,1}, \ldots, CSC_{i,p}\}$ of the base colorant $C_i$.

In a preferred embodiment from each colorant splitting curve set in the set of colorant splitting curve sets $\{CSC_{i,1}, \ldots, CSC_{i,p}\}$ the graininess is measured and in a more preferred embodiment of the colorant splitting method the determination is based on the measured graininess of each colorant splitting curve set in the set of colorant splitting curve sets $\{CSC_{i,1}, \ldots, CSC_{i,}\}$.

Another preferred embodiment is a content constituent output device which performs a preferred embodiment or preferred embodiments of the colorant splitting method by an colorant splitter which converts an n-dimensional colour in an n-dimensional colorant space to an m-dimensional colorant space wherein the colorants of the n-dimensional colorant space are n base colorants; and wherein a set of the colorants of the m-dimensional colorant space are constituent colorants $\{c_{i,1}, \ldots, c_{i,k}\}$ of a base colorant $C_i$; and wherein the colorant-splitter is characterized by an interpolator which interpolates the colorant splitting curve sets in a set of the colorant splitting curve sets $\{CSC_{i,1}, \ldots, CSC_{i,p}\}$ to a new colorant splitting curve set $CSC_{i,new}$; and a converter to convert the tone value of the base colorant $C_i$ in the n-dimensional colour with the new colorant splitting curve set $CSC_{i,new}$ to tone values for the constituent colorants $\{c_{i,1}, \ldots, c_{i,k}\}$ of the base colorant $C_i$.

The content constituent output device may comprise an inkjet head for jetting the constituent colorants $\{c_{i,1}, \ldots, c_{i,k}\}$ of the base colorant $C_i$ as multiple drops of ink.

Definitions

Content Constituent Output Devices

A content constituent output device is a content output device, such as display devices and printer devices, which are developed for the reproduction of content, such as 3D object, images and/or text to reproduce the content in an m-dimensional colorant space wherein a set of the colorants of the m-dimensional colorant space are constituent colorants $\{c_{i,1}, \ldots, c_{i,k}\}$ of a base colorant $C_i$, such as cyan C, magenta M, yellow Y, black K, red R, green G or blue B. To overcome graininess in the reproduced content, especially in the highlights of the content, such constituent colorants $\{c_{i,1}, \ldots, c_{i,k}\}$ of a base colorant $C_i$ in content output devices are used.

Preferably a content constituent output device performs a preferred embodiment of the colorant splitting method.

In a preferred embodiment the content constituent output device is a industrial inkjet system and more preferably a textile industrial inkjet system, ceramic industrial inkjet system, glass industrial inkjet system or decoration industrial inkjet system and on top of most preferably an industrial single-pass inkjet system.

In a preferred embodiment, the colorant splitting method has an m-dimensional colorant space wherein a set of the colorants of the m-dimensional colorant space are constituent colorants $\{c_{i,1}, \ldots, c_{i,k}\}$ of a base colorant $C_i$ and another set of the colorants of the m-dimensional colorant space are constituent colorants $\{c_{j,1}, \ldots, c_{j,k}\}$ of a base colorant $C_j$ and wherein the base colorant $C_i$ and base colorant $C_j$ are different.

A base colorant in a preferred embodiment of the colorant splitting method may be red R, green G, blue B, cyan C, magenta M, yellow Y, black K, violet V, orange O but may also be a spot colour, such as defined in Pantone: a the dominant spot colour printing system in the United States and Europe; or Toyo: a common spot colour system in Japan; or DIC: another common Japanese spot colour system; or ANPA: a palette of 300 colours specified by the American Newspaper Publishers Association for spot colour usage in newspapers; or GCMI: a standard for colour used in package printing developed by the Glass Packaging Institute (formerly known as the Glass Container Manufacturers Institute, hence the abbreviation); or HKS: a colour system which contains 120 spot colours and 3250 tones for coated and uncoated paper. HKS is an abbreviation of three German colour manufacturers: Hostmann-Steinberg Druckfarben, Kast+Ehinger Druckfarben and H. Schmincke & Co; or RAL (colour space system): a colour matching system used in Europe. The so-called RAL CLASSIC system is mainly used for varnish and powder coating.

Preferably the set of base colorants $\{C_1, \ldots, C_n\}$ in a preferred embodiment of the colorant splitting method are {red R, green G, blue B}, also called RGB; and more preferably the set of base colorants $\{C_1, \ldots, C_n\}$ in a preferred embodiment of the colorant splitting method are {cyan C, magenta M, yellow Y, black K}, also called CMYK; and most preferably the set of base colorants $\{C_1, \ldots, C_n\}$ in a preferred embodiment of the colorant splitting method are {cyan C, magenta M, yellow Y, black K} and the colorants of the m-dimensional colorant space are {cyan C, magenta M, yellow Y, black K, light cyan c, light magenta m}, also called CMYKcm.

Preferably the set of base colorants $\{C_1, \ldots, C_n\}$ in a preferred embodiment of the colorant splitting method are {cyan C, magenta M, yellow Y, black K}, and the colorants of the m-dimensional colorant space are {cyan C, magenta M, yellow Y, black K, light cyan c, light magenta m, light black k}, also called CMYKcmk.

A base colorant is also called a saturated colorant.

Constituent colorants $\{c_{i,1}, \ldots, c_{i,k}\}$ of a base colorant $C_i$ have approximately the same hue as the base colorant $C_i$ or have approximately the same chroma.

The absolute hue difference $\Delta h_{ab}$ between the CIELab value of a constituent colorant $c_{i,k}$ of a base colorant $C_i$ and the CIELab value of the base colorant $C_i$ is preferably in a preferred embodiment of the colorant splitting method smaller than 15. The hue difference $\Delta h_{ab}$ in CIELab between two colours ($\{L_1, a_1, b_1\}$, $\{L_2, a_2, b_2\}$) is defined as $$\Delta h_{ab} = \tan^{-1}\left(\frac{b_1}{a_1}\right) - \tan^{-1}\left(\frac{b_2}{a_2}\right)$$

The absolute hue difference $\Delta h_{ab}$ in CIELab between the CIELab value of a constituent colorant ci,k of a base colorant Ci and the CIELab value of the base colorant Ci is preferably in a preferred embodiment of the colorant splitting method smaller than 10 and more preferably smaller than 7.5 and most preferably smaller than 5.

The absolute chroma difference $\Delta C_{ab}$ between the CIELab value of a constituent colorant $c_{i,k}$ of a base colorant $C_i$ and the CIELab value of the base colorant $C_i$ is preferably in a preferred embodiment of the colorant splitting method smaller than 15. The chroma difference $\Delta C_{ab}$ in CIELab between two colors ($\{L_1, a_1, b_1\}$, $\{L_2, a_2, b_2\}$) is defined as:

$$\Delta C_{ab} = \sqrt{a_2^2 + b_2^2} - \sqrt{a_1^2 + b_1^2}$$

The absolute chroma difference $\Delta Cab$ in CIELab between the CIELab value of a constituent colorant ci,k of a base colorant Ci and the CIELab value of the base colorant Ci is preferably in a preferred embodiment of the colorant splitting method smaller than 10 and more preferably smaller than 7.5 and most preferably smaller than 5.

The luminance of the CIELab value of a constituent colorant $c_{i,k}$ of a base colorant $C_i$ may have a higher luminance than the CIELab value of its base colorant $C_i$.

A diluted colorant, such as light magenta m for a base colorant magenta M, is an example of a constituent colorant.

The constituent colorants $\{c_{i,1}, \ldots, c_{i,k}\}$ of a base colorant $C_i$ are sometimes called multi-density colorants $\{c_{i,1}, \ldots, c_{i,k}\}$ if the luminance of each CIELab value of constituent colorant $c_{i,k}$ are different.

The luminance difference $\Delta L$ between two CIELab values ($\{L_1, a_1, b_1\}$, $\{L_2, a_2, b_2\}$) is defined as:

$$\Delta L = (L_2 - L_1)$$

More information about luminance, hue of colours, colour differences, CIELab, CIEXYZ is disclosed in DR. R. W. G. HUNT. The reproduction of colour. 4th edition. England: Fountain Press, 1987.

A preferred content constituent output device, that performs a preferred embodiment of the colorant splitting method, comprises an inkjet printhead that jets a set of constituent colorants $\{c_{i,1}, \ldots, c_{i,k}\}$ of the base colorant $C_i$ as multiple drops of ink. Such an inkjet printhead is also called a multi-density inkjet printhead. An example of a multi-density inkjet printhead is disclosed in EP 1911589 B (TOSHIBA TEC KK).

Another preferred content constituent output device, that performs a preferred embodiment of the colorant splitting method, comprises an inkjet printhead that jets a constituent colorant $c_{i,j}$ of the set of constituent colorants $\{c_{i,1}, \ldots, c_{i,k}\}$ of the base colorant $C_i$ as ink and another inkjet printhead that jets another constituent colorant $c_{i,p}$ of the set of constituent colorants $\{c_{i,1}, \ldots, c_{i,k}\}$ of the base colorant $C_i$ as ink.

A preferred content constituent output device, that performs a preferred embodiment of the colorant splitting method, may comprise an inkjet printhead that jets a set of the constituent colorants of the base colorant $C_i$ as multiple drops of ink and an inkjet printhead that jets another set of constituent colorants of the base colorant $C_i$ as multiple drops of ink.

Before reproducing the content, typically in a content constituent output device, the presentation of the content, such as a document, is first manipulated towards a two-dimensional discrete image M(x, y) with a plurality of n-dimensional colours defined in an n-dimensional colorant space wherein the colorants of the n-dimensional colorant space are the n base colorants $\{C_1, \ldots, C_n\}$ of the content constituent output device. This first manipulation is also called interpreting (INTER). Secondly the two-dimensional discrete image M(x, y) with a plurality of n-dimensional colours defined in the n-dimensional colorant space wherein the colorants of the n-dimensional colorant space are the n base colorants $\{C_1, \ldots, C_n\}$ of the content constituent output device are converted towards a two-dimensional discrete image N(x, y) with a plurality of m-dimensional colours defined in an m-dimensional colorant space wherein a set of the colorants of the m-dimensional colorant space are constituent colorants $\{c_{i,1}, \ldots, c_{i,k}\}$ of a base colorant $C_i$ by using a colorant split curve set $CSC_i$. This second conversion is called a colorant splitting method performed by a colorant splitter (SPLIT). After the second conversion a halftoning method, such as an error-diffusion method, may convert the two-dimensional discrete image N(x, y) with the plurality of m-dimensional colours to a two-dimensional discrete image O(x, y) that represents a halftone. A halftoning method is also called a screening method (SCREEN). More in depth information about halftoning methods are disclosed in ULICHNEY, Robert. Digital Halftoning. The MIT Press. ISBN 0262210096. and H. R. KANG. Digital Color Halftoning. SPIE/IEEE Press, 1999. ISBN 0819433187.

After the halftoning method the two-dimensional discrete image O(x, y), that represents the halftone, may be transferred to a content constituent output device (TRANSF) to reproduce the presentation of the content.

The colorant splitting method of a preferred embodiment may be a software implemented method that is performed by a central processing unit (CPU); comprised in hardware (HW) configuration such as a computer, tablet computer and the like. A step in the colorant splitting method may preferably be performed by a graphic processor unit (GPU).

The manipulation from the presentation of the content, such as a document, towards a two-dimensional image with a plurality of n-dimensional colours defined in n-dimensional colorant space wherein the colorants of the n-dimensional colorant space are base colorants $\{C_1, \ldots, C_n\}$ may be performed by a raster image processing method in a raster image processor (RIP). One of the manipulations in the raster image processor (RIP) may be a colour conversion from a colour in an independent colour space, such as CIE-Lab or CIE-XYZ to an n-dimensional colour in the n-dimensional colorant space by a colour management system (CMS). Preferably a step in the colour conversion method is performed by a graphic processing unit (GPU). More in depth information about colour management systems (CMS's) is disclosed in SHARMA, GAURAV. Digital Color Imaging HANDBOOK. Edited by SHARMA, GAURAV. New York: CRC Press, 2002.

A Colorant Split Curve Set

A colorant split curve set $CSC_i$ of a base colorant $C_i$ is a set of curves for each constituent colorant $\{c_{i,1}, \ldots, c_{i,k}\}$ of the base colorant $C_i$. The colorant split curve set $CSC_i$ of the base colorant $C_i$ returns on a tone value of the base colorant $C_i$ a set of tone values, one tone value for each constituent colorant of the set of constituent colorants $\{c_{i,1}, \ldots, c_{i,k}\}$ of colorant $C_i$.

A tone value of a base colorant $C_i$ and constituent colorant $c_{i,j}$ may range from 0% (e.g. no colorant laid down on a receiving substrate such as paper) to 100% (e.g. maximum amount of colorant laid down on the receiving substrate). A tone value of a base colorant Ci and constituent colorant $c_{i,j}$ may also range from 0 to 255 if the colorant split method is performed in eight bit or may range from 0 to 65535 if the colorant split method is performed in sixteen bit.

A colorant split curve set used for a printing device is sometimes called ink splitting curve sets or ink mixing curve sets. In some patent literature a colorant split curve set is called a blending transformation, performed by a blender.

Preferably a curve in a colorant split curve set $CSC_i$ of a base colorant $C_i$ in a preferred embodiment of the colorant splitting method is defined as piecewise-defined function or more preferably a curve in a colorant split curve set $CSC_i$ of a base colorant $C_i$ in a preferred embodiment of the colorant splitting method is defined as piecewise linear function (=piecewise defined function) The piecewise linear function of the curve is preferably defined as a look-up-table (LUT), sometimes called ink mixing table or ink split table. Most preferably a curve in a colorant split curve set $CSC_i$ of a base colorant $C_i$ in a preferred embodiment of the colorant splitting method is defined as a continuous piecewise linear function (=piecewise-defined function) which is preferably defined as a look-up-table (LUT). By interpolation algorithms the curve that is defined as piecewise linear function or piecewise-defined function or continuous piecewise linear function may be interpreted.

A curve in a colorant split curve set $CSC_i$ of a base colorant Ci may also defined as look-up-table (LUT) of points p(x, y) from which the curve is interpreted with interpolation algorithms such as polynomial approximation.

A piecewise defined function (also called a piecewise function) is a function which is defined by multiple subfunctions, each subfunction applying to a certain interval of the main function's domain (a subdomain).

A colorant changing point (CCP) in a curve of a constituent colorant $c_{i,j}$ in a colorant split curve set $CSC_i$ of a base colorant $C_i$ in a preferred embodiment of the colorant splitting method may be:

a point on the curve wherein the tone value of the base colorant Ci equal is to zero; or a point on the curve wherein the tone value of the base colorant Ci equal is to the maximum tone value; or a point on the curve wherein the tone-value of the constituent colorant $c_{i,j}$ is a maximum; or a point on the curve wherein the tone-value of the constituent colorant $c_{i,j}$ is a minimum; or a point on the curve wherein the tone-value of the constituent colorant $c_{i,j}$ is a local maximum; or a point on the curve wherein the tone-value of the constituent colorant $c_{i,j}$ is a local minimum; or a point on the curve wherein the curve is not differentiable.

A curve, as piecewise defined function, in a colorant split curve set $CSC_i$ of a base colorant $C_i$ in a preferred embodiment of the colorant splitting method may have colorant changing points (CCP's) wherein a subfunction of the piecewise defined function starts and/or wherein a subfunction of the piecewise defined function ends.

In colorant changing points the point on the curve may have a tangent line with a slope equal to zero or may have a derivative of the curve in that point to be equal to zero.

In a preferred embodiment of the colorant splitting method the interpolation of colorant split curve sets of base colorant $C_i$ may interpolate curves of the colorant split curve sets for the same constituent colorant $c_{i,j}$ of the base colorant $C_i$. As illustrated in FIG. 8 the first curve (401) may be the result of the interpolation of the first curves (401) in FIG. 7 and FIG. 9.

In a preferred embodiment of the colorant splitting method the interpolation of the set of colorant splitting curve sets $\{CSC_{i,1}, \ldots, CSC_{i,p}\}$ of a base colorant $C_i$ depends on the equivalent coverage $EC_i$ of the base colorant $C_i$ for the n-dimensional colour of a preferred embodiment of the colorant splitting method.

If the equivalent coverage $EC_i$ of the n-dimensional colour for the base colorant Ci is low ($<T_1$) the colorant split curve set of the set of colorant split curve sets $\{CSC_{i,1}, \ldots, CSC_{i,p}\}$ with the lowest graininess may be chosen and if the equivalent coverage ECi of the n-dimensional colour for the base colorant Ci is high ($>T_2$) the colorant split curve set of the set of colorant split curve sets $\{CSC_{i,1}, \ldots, CSC_{i,p}\}$ with the highest graininess may be chosen. But if the equivalent coverage $EC_i$ of the n-dimensional colour for the base colorant $C_i$ is between low and high [T1, T2] the colorant split curve set with lowest graininess and colorant split curve set with highest graininess may be interpolated to a new colorant split curve set, preferably based on the equivalent coverage $EC_i$, to convert the value of the base colorant $C_i$ in the n-dimensional colour to values of the constituent colorants $\{c_{i,1}, \ldots, c_{i,k}\}$ of the base colorant $C_i$.

A curve in a colorant split curve set may be interpreted as a shape. In a preferred embodiment of the colorant splitting method the interpolation of colorant split curve sets of base colorant Ci may interpolate curves of the colorant split curve sets for the same constituent colorant $c_{i,j}$ of the base colorant $C_i$ such as shape interpolation methods. Shape interpolation methods are mainly used in morphing methods. A shape interpolation method is disclosed in HENRY JOHAN, et al. Morphing Using Curves and Shape Interpolation Techniques. *PROC. OF THE PACIFIC GRAPHICS 2000*. 2000.

The interpolation of the curves may be done in a preferred embodiment of the colorant splitting method by comprising a step of interpolation of one or more points on each curve and in a more preferred embodiment of the colorant splitting method by comprising a step of interpolation of one or more colorant changing points (CCP's) on each curve. As illustrated in FIG. 8 the first curve (401) may be the result of the interpolation of the first curves (401) in FIG. 7 and FIG. 9 by interpolating the colorant changing point CCP (402) of FIG. 7 and FIG. 9 to the colorant changing point CCP (402) in FIG. 8. The path that is formed by the interpolation of the points of each curve is called an interpolation path. The interpolation path may be a linear curve.

Equivalent Coverage

The equivalent coverage $EC_i$ of a base colorant $C_i$ from an n-dimensional colour $\{v_{C1}, \ldots, v_{Cn}\}$ in an n-dimensional colorant space wherein the colorants of the n-dimensional colorant space are n base colorants $\{C_1, \ldots, C_n\}$ depends on the tone value of one or more base colorant from the n-dimensional colour except for the tone value of the base colorant $C_i$. The equivalent coverage $EC_i$ may be defined by the Formula (I):

$$EC_i = f(v_{Cj})$$

wherein $j \in [1,n]$ and $j \neq i$; and
wherein $v_{Cj}$ is the tone value of the base colorant $C_j$ from an n-dimensional colour $\{v_{C1}, \ldots, v_{Cn}\}$.

In a preferred embodiment of the coverage splitting method the equivalent coverage $EC_i$ of a base colorant $C_i$ from an n-dimensional colour $\{v_{C1}, \ldots, v_{Cn}\}$ in an n-dimensional colorant space wherein the colorants of the n-dimensional colorant space are n base colorants $\{C_1, \ldots, C_n\}$ depends on the tone values of two or more base colorant from the n-dimensional colour except for the tone value of the base colorant $C_i$ and depends on weight factors of the two or more base colorants. The equivalent coverage $EC_i$ may be defined by the Formula (II):

$$EC_i = f(v_{Cj}, v_{Ck}, w_j, w_k)$$

wherein $j \in [1,n]$ and $j \neq i$; and
wherein $k \in [1,n]$ and $k \neq i$; and
wherein $v_{Cj}$ is the tone value of the base colorant $C_j$ from an n-dimensional colour $\{v_{C1}, \ldots, v_{Cn}\}$; and
wherein $v_{Ck}$ is the tone value of the base colorant $C_k$ from the n-dimensional colour $\{v_{C1}, \ldots, v_{Cn}\}$; and
wherein wj is a weight factor for base colorant $C_j$; and
wherein wk is a weight factor for base colorant $C_k$.

Preferably the weight factors of the base colorants represent the contrast or relative contrast of the base colorants $\{C_1, \ldots, C_n\}$.

In a preferred embodiment of the coverage splitting method the equivalent coverage $EC_i$ of a base colorant $C_i$ from an n-dimensional colour $\{v_{C1}, \ldots, v_{Cn}\}$ in an n-dimensional colorant space wherein the colorants of the n-dimensional colorant space are n base colorants $\{C_1, \ldots, C_n\}$ depends on the tone values of two or more base colorant from the n-dimensional colour except for the tone value of the base colorant $C_i$ and depends on weight factors of the two or more base colorants and the weight factor of base colorant $C_i$. The equivalent coverage $EC_i$ may be defined by the Formula (III):

$$EC_i = f(v_{Cj}, v_{Ck}, w_i, w_j, w_k)$$

wherein $j \in [1,n]$ and $j \neq i$; and
wherein $k \in [1,n]$ and $k \neq i$; and
wherein $v_{Cj}$ is the tone value of the base colorant $C_j$ from an n-dimensional colour $\{v_{C1}, \ldots, v_{Cn}\}$; and
wherein $v_{Ck}$ is the tone value of the base colorant $C_k$ from the n-dimensional colour $\{v_{C1}, \ldots, v_{Cn}\}$; and
wherein $w_i$ is a weight factor for base colorant $C_i$; and
wherein $w_j$ is a weight factor for base colorant $C_j$; and
wherein wk is a weight factor for base colorant $C_k$.

Preferably the weight factors of the base colorants represent the contrast or relative contrast of the base colorants $\{C1, \ldots, C_n\}$.

In another preferred embodiment of the coverage splitting method the equivalent coverage $EC_i$ of a base colorant $C_i$ from an n-dimensional colour $\{v_{C1}, \ldots, v_{Cn}\}$ in an n-dimensional colorant space wherein the colorants of the n-dimensional colorant space are n base colorants $\{C_1, \ldots, C_n\}$ gives the return tone value of a function which is the sum of the tone values multiplied with a factor of two or more base colorants from the n-dimensional colour except for the tone value of the base colorant $C_i$. Preferably the factors are calculated from weight-factors of the two or more base colorants and more preferably the factors are calculated from weight-factors of the two or more base colorants and the base colorant $C_i$. The equivalent coverage $EC_i$ may be defined by the Formula (IV):

$$EC_i = \alpha_0 \times v_{Cj} + \alpha_1 \times v_{Ck}$$

wherein $j \in [1,n]$ and $j \neq i$; and
wherein $k \in [1,n]$ and $k \neq i$; and
wherein $v_{Cj}$ is the tone value of the base colorant $C_j$ from an n-dimensional colour $\{v_{C1}, \ldots, v_{Cn}\}$; and
wherein $v_{Ck}$ is the tone value of the base colorant $C_k$ from the n-dimensional colour $\{v_{C1}, \ldots, v_{Cn}\}$.

If the n-dimensional colorant space is CMYK an example of equivalent coverage EC for cyan C from a four-dimensional colour $\{v_{cyan}, v_{magenta}, v_{yellow}, v_{black}\}$ may be defined by the formula (V):

$$EC_{cyan} = \frac{w_{magenta} \times v_{magenta} + w_{yellow} \times v_{yellow} + w_{black} \times v_{black}}{w_{cyan}}$$

wherein $\{w_{cyan}, w_{magenta}, w_{yellow}, w_{black}\}$ are weight factors for each base colorant {cyan C, magenta M, yellow Y, black K}. Preferably these weight factors represent the contrast or relative contrast of the n base colorants $\{C_1, \ldots, C_n\}$.

Graininess

Constituent colorants in content constituent output devices may be used to overcome graininess in the reproduced content, especially in the highlights of the content. For example the dots of the jetted ink of a colorant on a substrate by an inkjet printhead may become visible and appear grainy. Graininess is a psychophysical phenomenon as it is the human visual answer to physical spatial stimulus of local density variations in the reproduced content. Other names for graininess are e.g. image noise or granularity.

The graininess of the reproduced content is influenced by the colorant split curve set $CSC_i$ of a base colorant $C_i$ and/or a colorant changing point of a curve in the colorant split curve set $CSC_i$ of a base colorant $C_i$.

Several other methods of graininess measurement than visually human judgement are disclosed in:

ISO/IEC 13660:2001: Information technology—Office equipment—Measurement of image quality attributes for hardcopy output—Binary monochrome text and graphic images;

ISO/IEC TS 24790:2012: Information technology—Office equipment—Measurement of image quality attributes for hardcopy output—Monochrome text and graphic images. It specifies device-independent image quality attributes, measurement methods, and analytical procedures to describe the quality of output images from hardcopy devices. It is applicable to human-readable monochrome documents produced from printers and copiers;

Kodak Grain Ruler: A standard for graininess; a sequence of images of grain reproduced with their corresponding Print Grain Index numbers. More information is disclosed in U.S. Pat. No. 5,709,972 (EASTMAN KODAK COMPANY);

ISO 10505:2009: Photography—Root mean square granularity of photographic films—Method of measurement. It specifies a method for determining the intrinsic root mean square granularity (rms-granularity) of photographic films. Intrinsic rms-granularity refers to those density fluctuations produced solely by the distribution of developed image forming centres in the photographic emulsion;

ISO 15739:2013: Photography—Electronic still-picture imaging—Noise measurements.

Preferably the content constituent output device which performs a preferred embodiment of the ink splitting method comprises a graininess device which measures the graininess in a part of a reproduced content and preferably may measuring the graininess of a colorant splitting curve $CSC_i$ of a base colorant $C_i$.

By reproducing a graininess target which comprises a plurality of graininess patches of different tone values for a base colorant $C_i$ on a content constituent output device after a colorant splitting method by using a colorant split curve set $CSC_i$ the graininess of a colorant splitting curve set $CSC_I$ may be calculated by measuring the graininess of the reproduced graininess patches of the reproduced graininess target.

Another method to calculate the graininess of a colorant splitting curve set $CSC_I$ may be simulating the reproduction of a graininess target which comprises a plurality of graininess patches of different tone values for a base colorant $C_i$ after a colorant splitting method by using a colorant split curve set $CSC_i$ the graininess of a colorant splitting curve set $CSC_I$ may be calculated by measuring the graininess of the simulated reproduced graininess patches of the simulated reproduced graininess target.

Preferably in a preferred embodiment of the colorant splitting method, the measurement of the graininess of the first colorant splitting curve set $CSC_{i,1}$ of the base colorant $C_i$ is smaller than a second colorant splitting curve set $CSC_{i,2}$ of the base colorant $C_i$ so the graininess of the first colorant splitting curve set $CSC_{i,1}$ is lower than the graininess of the second colorant splitting curve set $CSC_{i,2}$.

In a preferred embodiment of the colorant splitting method, a colorant splitting curve set $CSC_i$ of the base colorant $C_i$ is determined by the graininess of the colorant splitting curve set.

In another preferred embodiment of the colorant splitting method, a colorant splitting curve set $CSC_i$ of the base colorant $C_i$ is optimized to have a different graininess, preferably a lower graininess, by adapting a colorant changing point in a curve of the colorant splitting curve set $CSC_i$ of the base colorant $C_i$. Preferably this optimization is performed by iterative measuring the graininess of the colorant splitting curve set $CSC_i$ of the base colorant $C_i$ after each time adapting a colorant changing point in a curve of the colorant splitting curve set $CSC_i$ of the base colorant $C_i$.

Contrast

The contrast of a colour is the degree of difference in tone between the colour and a colour with very high luminance such as white or between the colour and a colour with very low luminance such as black. The contrast of a colour may be calculated from the luminance difference $\Delta L$ of the CIELab value of the colour and the CIELab value of the colour whereon the content is reproduced, such as a substrate.

Graphic Processing Units

Graphic Processing Units (GPU's) have been used to render computer graphics for years. Nowadays they are also used for general-purpose tasks due to their highly parallel structure, making them more efficient than Central Processing Units (CPU's), especially in algorithms for two-dimensional discrete images such as image manipulation methods.

GPUs can be combined with CPUs to achieve greater performance. In this way, serial parts of the code would run on the CPU and parallel parts would do it on the GPU. While CPUs with multiple cores are available for every new computer and allow the use of parallel computing, these are focused on having a few high performance cores. On the other hand, GPUs have an architecture consisting of thousands of lower performance cores (FIG. 13), making them especially useful when large amount of data have to be processed.

One of the most popular tools available on the market of GPU computing is CUDA. CUDA is a parallel computing platform and programming model created by Nvidia™ and available only for their GPUs. The main advantage of CUDA is its ease of use, using the language known as CUDA C which is essentially an extension of C, with similar syntax and very easy to integrate in a C/C++ environment.

FIG. 12 illustrates the CUDA processing flow. The needed data is first copied from the main memory to the GPU memory (①), the CPU sends an instruction to the GPU (②), the GPU executes the instruction in all the parallel cores at the same time (③), and the result is copied back from the GPU memory to the main memory (④).

CUDA parallel execution units consist of threads grouped into blocks. Combining the use of blocks and threads the maximum number of available parallel units can be launched, which for the latest GPUs can be more than 50 million. Even though this is a great amount of parallel capability, there are some cases where data might exceed the limit. In those cases, the only possibility is to iterate through the grid of millions of parallel units as many times as needed till all the data is processed.

Document

A document comprises content, graphically arranged, in a document space. A document is digital stored in a storage unit such as hard disk drive (HDD) connected to a hardware configuration such as a computer, memory in a central processing unit (CPU) comprised in a hardware configuration and the like. The graphically arrangement, also called lay-outing, of the content in the document space is also called the lay-out of the document.

The document space of the document may have a two dimensional space with two fixed dimensions, more preferably the document space is a page or multiple pages and most preferably a web-page. The document space may be a two dimensional space with one fixed and one endless dimension such as in the rendering method of multiple print jobs disclosed in EP 1933257 (Agfa Graphics NV).

The content of a document may be defined in one or more colours by one or more content objects such as photographic images, business graphs, text, labels and the like, which are also called objects of the document. A content object in a document represents an image. A content object is preferably a vector graphic or a raster graphic, more preferably a raster graphic and most preferably a photographic image. A raster graphic is also known as a bitmap, contone or a bitmapped graphic and represent a two-dimensional discrete image $P(x, y)$. A vector graphic, also known as object-oriented graphic, uses geometrical primitives such as points, lines, curves, and shapes or polygon(s), which are all based on mathematical expressions, to represent an image.

The content of the document is preferably defined in a vector graphics format, also called line-work format, such as Scale Vector Graphics (SVG) or AutoCad Drawing Exchange Format (DXF) and more preferably defined in a page description language (PDL) such as Printer Command Language (PCL): developed by Hewlett Packard, Postscript (PS): developed by Adobe Systems or Portable Document Format (PDF): developed by Adobe Systems. Preferably the lay-out of the document in this preferred embodiment is created in a desktop publishing (DTP) software package such as Adobe InDesign™, Adobe PageMaker™, QuarkXpress™ or Scribus (http://scribus.net/canvas/Scribus).

A document may be defined in a document markup language, also called mark-up language, such as IBM's Generalized Markup Language (GML) or Standard Generalized Markup Language (ISO 8879:1986 SGML), more preferably defined in HyperText Markup Language (HTML) and most preferably defined in HTML5, the fifth revision of the HTML standard (created in 1990 and standardized as HTML 4 as of 1997) and, as of December 2012, is a candidate recommendation of the World Wide Web Consortium (W3C). Such a document is sometimes called a web-document. Preferably the layout of the document is created in a web-design software package by Cascading Style Sheets (CSS), a style sheet language used for describing the content of the document in the document markup language and more preferably the layout of the document is created in a web-design software package by Cascading Style Sheets 3 (CSS3), published from the CSS Working Group of the World Wide Web Consortium (W3C).

The content of the document may be defined in a Variable Data Printing format (VDP) such as Intelligent Printer Data Streams (IPDS): found in the AS400 and IBM mainframe environments and used with dot matrix printers, Variable data Intelligent PostScript Printware (VIPP): A proprietary VDP language from Xerox, traditionally used in the transactional black-and-white printing market, Variable Print Specification (VPS): a VDP language from Creo, Advanced Function Presentation (AFP) format defined by AFP Consortium (AFPC), more preferably defined in Personalized Print Markup Language (PPML), an XML-based industry standard printer language for variable data printing defined by Printing On Demand Initiative (PODi) and most preferably defined in PDF/VT published in 2010 as ISO 16612-2.

Raster Image Processing Method

A raster image processing method is an image manipulation method that interpret a document to render the interpretation of the document to:

a raster graphic which is suitable for viewing on a display device such as a television, computer monitors or the display device of a tablet computer; or a raster graphic which is suitable for projecting the raster graphic by a projector device such as a video-projector, LCD projector, DLP projector LED projector or laser diode projector; or a raster graphic which is suitable for printing on a printing device such as a toner-based printer, an inkjet printer or offset press.

A content output device, such as a display device, projector device, content constituent output device or printer device, is a device which reproduces the content data of a document in its document space.

The apparatus that performs a raster image processing method is called a raster image processor (RIP). A raster image processor (RIP) may comprise a prepress workflow system such as Prinect Workflow System™ from Heidelberger Druckmaschinen AG or Apogee Prepress™ from Agfa Graphics NV or the prepress workflow system disclosed in US20130194598 (FUJI XEROX).

A raster image processor may comprise a cloud-based web-to-print solution that enables print service providers (PSP) and/or marketing services providers to create and manage online stores for printed documents. Preferably an user may layout or edit documents in this cloud-based web-to-print solution with an online document editor.

A raster image processor may also comprise a web portal for document-upload and sending a print approval of a document. A web portal is a specially-designed web page at a website which brings information together from diverse sources in a uniform way.

A raster image processing method may also comprise an extra step of soft-proofing. Preferably the soft-proofing comprises a streaming method to shortens file transfer and approval cycles by using streaming technology for large or many soft-proofs. Soft-proofing, also called monitor proofing, is a step in the prepress printing process to check the accuracy of text and images used for printed products on a display device before printing.

A raster image processor may comprise a colour management system (CMS) to provide end-to-end colour management for reliable, predictable colour performance. Preferably the colour management system (CMS) is compatible with ICC profiles; and/or able to build custom colour profiles to match and to certify a printing device to a proofing standard such as ISO 12647-2 or ISO 12647-7.

A raster image processing method may be a software implemented method that is performed by a central processing unit (CPU); comprised in hardware (HW) configuration such as a computer, tablet computer and the like. A step in the raster image processing method may be performed by a graphic processor unit (GPU).

Example

Let us consider an example of a preferred embodiment of the colorant splitting method wherein the n-dimensional colorant space is CMYK and the m-dimensional colorant space {c, C', M, Y, K} and a first colorant splitting curve set is as illustrated in FIG. 1 and a second colorant splitting curve set is as illustrated in FIG. 2. To reduce ink consumption for a printing system using the constituent colorants light cyan c and heavy cyan C' of the base colorant cyan C, the use of the light cyan c may to be suppressed in the darker colorants of the reproduced content (such as n-dimensional colour {80% for cyan C, 70% for magenta M, 10% for black K) in the n-dimensional colorant space. The curve of light cyan c of the first colorant splitting curve set is the curve (401) as illustrated in FIG. 1 and the curve of heavy cyan C' of the first colorant splitting curve set is the curve (411) as illustrated in FIG. 1. The curve of light cyan c of the second colorant splitting curve set is the curve (401) as illustrated in FIG. 2 and the curve of heavy cyan C' of the second colorant splitting curve set is the curve (411) as illustrated in FIG. 2. Therefore in this example of the invention the first colorant splitting curve set of cyan C varies continuously as a function of the an equivalent coverage (EC) of cyan C to the second colorant splitting curve set.

In this example of a preferred embodiment of the colorant splitting method, the equivalent coverage (EC) of cyan C is defined as:

$$EC_C(M, Y, K) = \frac{w_M \times M + w_Y \times Y + w_K \times K}{w_C}$$

wherein $w_C$ is a weighing factor for the contrast of cyan C and equals 6; and
wherein $w_M$ is a weighing factor for the contrast of magenta M and equals 5; and
wherein $w_Y$ is a weighing factor for the contrast of yellow Y and equals 1; and
wherein $w_K$ is a weighing factor for the contrast of black K and equals 10.

A transition interval $[T_1, T_2]$ is in this example defined to indicate the region wherein the first colorant splitting curve set of cyan C varies continuously as a function of the an equivalent coverage ($EC_C$) of cyan C to the second colorant splitting curve set:
If $EC_c < T_1$ the first colorant splitting curve set is used, $\alpha = 1$; and
if $EC_c > 12$ the second colorant splitting curve set is used, $\alpha = 0$; and
In between $[T_1, T_2]$ the first and second colorant splitting curve set is interpolated, $$\alpha = \frac{(T_2 - EC_C)}{(T_2 - T_1)}$$

In this example of a preferred embodiment of the colorant splitting method a tone value k is defined wherein the point in the curve of light cyan in the first colorant splitting curve set is a colorant changing point (402). The tone value k is in this example 50%.

In this example the first and second colorant splitting curve sets may be visualized in a colorant triangle view as illustrated in FIG. 14 whereon the horizontal axis (1401) the tone values of the light cyan c can be read and whereon the vertical axis (1402) the tone values of the heavy cyan C' can be read. The path $P_1$ (1411) from the first colorant splitting colorant starts off along the horizontal axis (pure light cyan c) and at tone value k (1421) (=in this example 50%) the path twists as the light cyan c drops and the heavy cyan C' comes up. The path moves towards the vertical axis (pure heavy cyan C') for the darkest tone values of cyan C. The path P2 (1412) from the second colorant splitting colorant starts off along the vertical axis.

Suppose that in this example $0 < \alpha < 1$, the interpolated colorant splitting curve set will follow path $P_1$ for a tone value of cyan C smaller than $\alpha \times k$ and it will follow path $P_2$ for a tone value of cyan C larger than $\alpha \times 100$.

For tone values of cyan C between $\alpha \times k$ and $\alpha \times 100$ an alternative path $P_{new}$ (1413) is used which is obtained by interpolating the first and second colorant splitting curve sets. The resulted colorant splitting curve set $CSC_{new}$ from the interpolation of the first and second colorant splitting curve set in this example of a preferred embodiment of the colorant splitting method may be the result of:

$$CSC_{new}(1-\beta) \times CSC_1 + \beta \times CSC_2$$

wherein $CSC_1$ the first colorant splitting curve set is; and
wherein $CSC_2$ the second colorant splitting curve sets is.

The interpolation weight $\beta$ in this example should vary smoothly between:
0 at tone value of cyan C equals $\alpha \times k$; and
1 at tone value of cyan C equals $\alpha \times 100$.

Define on path P1 the point p1 (1431) wherein the tone value of cyan C is equal to $\alpha \times k$ and define on path $P_2$ the point $p_2$ (1432) wherein the tone value of cyan C is equal to $\alpha \times 100$.

The interpolation weight $\beta$ for a tone value of cyan C is obtained by searching $t_1$ on path $P_1$ for this tone value of cyan C and searching $t_2$ on path $P_2$ for this tone value of cyan C. The interpolation weight $\beta$ is the length of line segment $[t_1, i]$ divided by the length of line segment $[t_1, t_2]$ wherein point i is the intersection of the line segment $[t_1, t_2]$ and $[p_1, p_2]$.

REFERENCE SIGNS LIST

TABLE 2

| | |
|---|---|
| 300, 1401 | X-axis |
| 301, 301, 1402 | Y-axis |
| 402, 403, 404, 405 | Colorant changing point |
| 401, 411, 421, 901, 911, 921, 931 | Curve of a colorant split curve set |
| 200 | Colorant split curve set |
| 412, 413, 414, 415 | Colorant changing point |
| 422, 423, 424 | Colorant changing point |
| 501 | INTER |
| 502 | SPLIT |
| 503 | SCREEN |
| 504 | TRANSFER |
| 980 | Interpolation |
| 902, 912, 922, 904, 914, 924, 903, 913, 923 | Colorant changing point |
| 981, 982 | Interpolation path |
| 1421, 1431, 1432 | A twist in a path of a colorant splitting curve set |
| 1411, 1412, 1413 | Path of a colorant splitting curve set |

The invention claimed is:
1. A colorant splitting method for a content constituent output device from an n-dimensional color in an n-dimensional colorant space to an m-dimensional color in an m-dimensional colorant space, wherein colorants of the n-dimensional colorant space are base colorants and colorants of the m-dimensional colorant space are constituent colorants of the base colorants, the colorant splitting method comprising the steps of:

determining a first colorant splitting curve set of a first base colorant and that has a first level of graininess;

determining a second colorant splitting curve set of the first base colorant and that has a second level of graininess which is higher than the first level of graininess;

obtaining a new colorant splitting curve set by interpolating between the first colorant splitting curve set and the second colorant splitting curve set using an interpolation factor; and obtaining tone values for the constituent colorants by converting a tone value of the first base colorant using the new colorant splitting curve set; wherein the interpolating step includes:

determining relative contrast weights of the base colorants;

calculating an equivalent coverage of the first base colorant as a parameter of a coverage of at least one of the base colorants and the relative contrast weights of the at least one of the base colorants, the at least one of the base colorants excluding the first base colorant; and deriving the interpolation factor from the equivalent coverage of the first base colorant.

2. The colorant splitting method according to claim 1, further comprising selecting a transition interval; wherein the first colorant splitting curve set is used when the equivalent coverage is less than a minimum of the transition interval;

the second colorant splitting curve set is used when the equivalent coverage is greater than a maximum of the transition interval; and the new colorant splitting curve set is used when the equivalent coverage is between the minimum of the transition interval and the maximum of the transition interval.

3. The colorant splitting method according to claim 1, further comprising printing the constituent colors in the m-dimensional colorant space.

4. A content constituent output device comprising:

a colorant-splitter that converts an n-dimensional color in an n-dimensional colorant space to an m-dimensional color in an m-dimensional colorant space, colorants of the n-dimensional colorant space are base colorants and colorants of the m-dimensional colorant space are constituent colorants of the base colorants, the colorant-splitter including:

a determination device that determines a first colorant splitting curve set of a first base colorant and that has a first level of graininess;

a determination device that determines a second colorant splitting curve set of the first base colorant and that has a second level of graininess which is higher than the first level of graininess;

an interpolator that obtains a new colorant splitting curve set by interpolating between the first colorant splitting curve set and the second colorant splitting curve set using an interpolation factor; and a converter that obtains tone values for the constituent colorants of the first base colorant by converting tone values of the first base colorant using the new colorant splitting curve set; wherein the interpolator includes:

a determiner that determines relative contrast weights of the base colorants;

a calculator that calculates an equivalent coverage of the first base colorant as a parameter of a coverage of at least one of the base colorants and the relative contrast weights of the at least one of the base colorants, the at least one of the base colorants excluding the first base colorant; and a calculation device that derives the interpolation factor from the equivalent coverage of the first base colorant.

5. The content constituent output device according to claim 4, further comprising a printer that prints content with the constituent colors in the m-dimensional colorant space.

\* \* \* \* \*